US010795326B2

(12) United States Patent
Kobayashi et al.

(10) Patent No.: US 10,795,326 B2
(45) Date of Patent: Oct. 6, 2020

(54) INFORMATION PROCESSING APPARATUS, AND METHOD

(71) Applicant: SONY CORPORATION, Tokyo (JP)

(72) Inventors: Yoshiyuki Kobayashi, Tokyo (JP); Yasufumi Tanaka, Kanagawa (JP); Shingo Takamatsu, Tokyo (JP); Atsushi Noda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/465,232

(22) PCT Filed: Nov. 24, 2017

(86) PCT No.: PCT/JP2017/042153
§ 371 (c)(1),
(2) Date: May 30, 2019

(87) PCT Pub. No.: WO2018/105412
PCT Pub. Date: Jun. 14, 2018

(65) Prior Publication Data
US 2020/0012237 A1 Jan. 9, 2020

(30) Foreign Application Priority Data
Dec. 7, 2016 (JP) ................. 2016-237602

(51) Int. Cl.
G05B 13/02 (2006.01)
B25J 13/08 (2006.01)
(Continued)

(52) U.S. Cl.
CPC ....... G05B 13/0265 (2013.01); B25J 11/0005 (2013.01); B25J 13/08 (2013.01); G05B 13/042 (2013.01); G06N 3/008 (2013.01)

(58) Field of Classification Search
None
See application file for complete search history.

(56) References Cited

U.S. PATENT DOCUMENTS 4,389,706 A * 6/1983 Gomola ................. G05B 21/02
700/1
6,317,700 B1 * 11/2001 Bagne .................... G06N 5/025
702/181
(Continued)

FOREIGN PATENT DOCUMENTS

CN 101390024 A 3/2009
JP 2005-238422 A 9/2005
(Continued)

OTHER PUBLICATIONS

International Search Report and Written Opinion of PCT Application No. PCT/JP2017/042153, dated Feb. 20, 2018, 8 pages of ISRWO.

Primary Examiner — Ramesh B Patel
(74) Attorney, Agent, or Firm — Chip Law Group

(57) ABSTRACT

The present disclosure relates to an information processing apparatus, a method, and a program capable of causing a system to efficiently learn a method of controlling a person. A control learning system calculates a reward based on an input objective state of a control target and a state of the control target based on a sensing result of the control target. The control learning system performs reinforcement learning using the calculated reward and the state of the control target to select a better action for bringing the control target closer to the objective state. The control learning system executes the selected action for the control target. For example, the present disclosure can be applied to a control learning system including a terminal and a cloud system.

12 Claims, 11 Drawing Sheets

(51) Int. Cl.
*B25J 11/00* (2006.01)
*G06N 3/00* (2006.01)
*G05B 13/04* (2006.01)

(56) References Cited

U.S. PATENT DOCUMENTS

| | | | |
|---|---|---|---|
| 6,782,374 B2 * | 8/2004 | Nichols | G09B 7/04 706/15 |
| 2006/0064352 A1 * | 3/2006 | Paschal | G09B 19/18 434/107 |
| 2009/0012632 A1 * | 1/2009 | Sekiai | G05B 13/042 700/29 |
| 2010/0179930 A1 * | 7/2010 | Teller | G06N 20/00 706/12 |
| 2018/0330281 A1 * | 11/2018 | Teller | G06N 20/00 |

FOREIGN PATENT DOCUMENTS

| | | |
|---|---|---|
| JP | 2006-088251 A | 4/2006 |
| JP | 2007-272498 A | 10/2007 |
| WO | 2007/116590 A1 | 10/2007 |

* cited by examiner

FIG.3

| | |
|---|---|
| OBJECTIVE STATE: | [image of flexed arm] |
| DATE AND TIME OF ACHIEVEMENT: | EVERY 3 HOURS, AND CONTINUING AT LEAST TWO HOURS |
| ACTION: | UTTERANCE, MUSIC |
| FREQUENCY: | 20 TIMES/DAY AT MAXIMUM |
| COST: | 100 YEN/DAY |

[ADD]  [CANCEL]

FIG.4

| OBJECTIVE | OBJECTIVE AFTER RESOLUTION |
|---|---|
| PASS XX EXAMINATION | STUDY XX MINUTES EVERY DAY |
| REDUCE WEIGHT BY XX kg BY DIET | EXERCISE XX MINUTES EVERY DAY |
| ... | |

INFORMATION PROCESSING APPARATUS, AND METHOD

CROSS REFERENCE TO RELATED APPLICATIONS

This application is a U.S. National Phase of International Patent Application No. PCT/JP2017/042153 filed on Nov. 24, 2017, which claims priority benefit of Japanese Patent Application No. JP 2016-237602 filed in the Japan Patent Office on Dec. 7, 2016. Each of the above-referenced applications is hereby incorporated herein by reference in its entirety.

TECHNICAL FIELD

This disclosure relates to an information processing apparatus, a method, and a program, and in particular, to an information processing apparatus, a method, and a program capable of causing a system to efficiently learn a method of controlling a person.

BACKGROUND ART

Reinforcement learning is a learning method in which, with the aim that a system (robot, etc.) can make motions wisely on its own, it observes a state S and performs an action A for environments such that a reward R obtained from all environments other than itself, including others, becomes higher (see NPL 1).

CITATION LIST

Non Patent Literature

[NPL 1]
Hado van Hasselt, Arthur Guez, David Silver, "Deep Reinforcement Learning with Double Q-learning". [online]. 22 Sep. 2015. [Searched Nov. 25, 2016]. https://arxiv.org/abs/1509.06461

SUMMARY

Technical Problems

Now, people have a request to control themselves and others. However, the existing reinforcement learning has always been a method that causes a system to wisely operate. Also, there is a limit to the effort that a person can spend for controlling another person.

This disclosure is made in view of such circumstances and causes a system to efficiently learn a method of controlling a person.

Solution to Problems

An information processing apparatus according to one aspect of the present technique includes a reward calculating part configured to calculate a reward based on an input objective state of a control target and a state of the control target based on a sensing result of the control target, a reinforcement learning part configured to perform reinforcement learning using the reward calculated by the reward calculating part and the state of the control target to select a better action for bringing the control target closer to the objective state, and an action execution part configured to execute the action selected by the reinforcement learning part for the control target.

The information processing apparatus can further include a cause-and-effect analyzing part configured to perform a cause-and-effect analysis on the action executed for the control target, and an action adding part configured to add, as a result of the cause-and-effect analysis performed by the cause-and-effect analyzing part, a better action for bringing the control target closer to the objective state.

The information processing apparatus can further include a notifier configured to notify regarding the action added by the action adding part.

After the action is added by the action adding part, the notifier can notify completion of the addition of the action by the action adding part.

The notifier can notify a recommendation of the addition of the action by the action adding part. In a case where the addition of the action is instructed in response to the notification, the action adding part can add a better action for bringing the control target closer to the objective state.

The information processing apparatus can further include a decomposing part configured to decompose the objective state of the control target into smaller objectives.

The information processing apparatus can further include an action execution history DB configured to register a history of actions executed by the action execution part.

The information processing apparatus can further include an input receiving part configured to recognize the objective state of the control target through an input of an image.

The information processing apparatus can further include a sensor part configured to sense the control target.

The information processing apparatus further includes an action input part configured to input an action executed for the control target.

An information processing method according to one aspect of the present technique is executed by an information processing apparatus, the information processing method including calculating a reward based on an input objective state of a control target and a state of the control target based on a sensing result of the control target, performing reinforcement learning using the calculated reward and the state of the control target to select a better action for bringing the control target closer to the objective state, and executing the selected action for the control target.

A program according to one aspect of the present technique causes a computer to function as a reward calculating part configured to calculate a reward based on an input objective state of a control target and a state of the control target based on a sensing result of the control target, a reinforcement learning part configured to perform reinforcement learning using the reward calculated by the reward calculating part and the state of the control target to select a better action for bringing the control target closer to the objective state, and an action execution part configured to execute the action selected by the reinforcement learning part for the control target.

In one aspect of the present technique, a reward is calculated based on an input objective state of a control target and a state of the control target based on a sensing result of the control target, reinforcement learning is performed using the calculated reward and the state of the control target to select a better action for bringing the control target closer to the objective state, and the selected action is executed for the control target.

Advantageous Effect of Invention

According to the present technique, in particular, it is possible to cause a system to efficiently learn a method of controlling a person.

Note that the advantageous effect described in this specification is merely an example. The advantageous effect of the present technique is not limited to the advantageous effect described in this specification, and additional advantageous effects may be achieved.

BRIEF DESCRIPTION OF DRAWINGS

FIG. 3 is an explanatory diagram illustrating setting of an objective state.

FIG. 4 is a diagram illustrating an example of a data set used for decomposing an objective.

DESCRIPTION OF EMBODIMENTS

Modes for carrying out the present disclosure (hereinafter, referred to as embodiments) will be described below. Note that the description will be given in conformance with the following order.
1. First Embodiment (System Configuration)
2. Second Embodiment (Equipment Configuration)

1. First Embodiment

<Configuration Example of Control Learning System>

Figure 1:
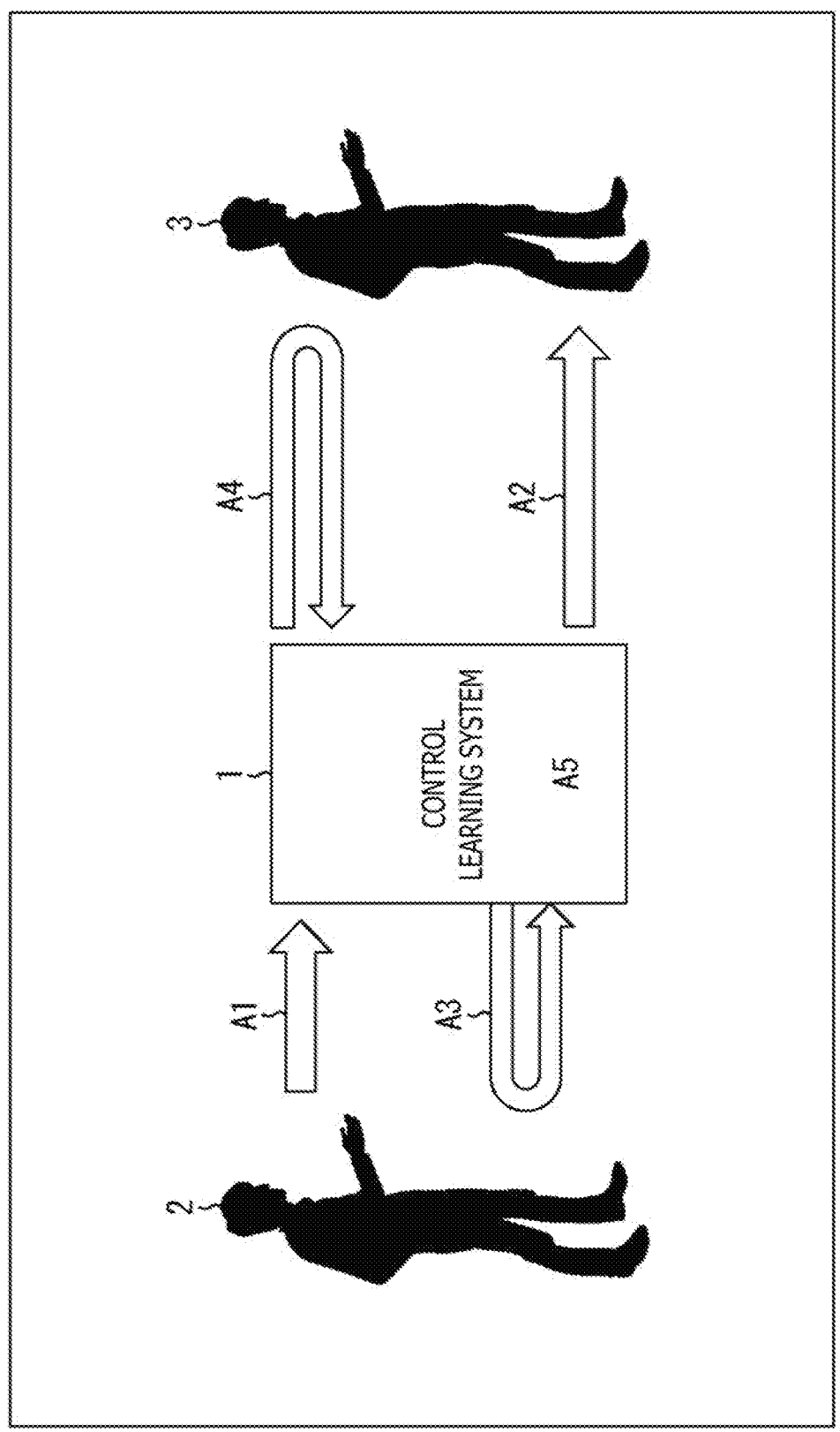
FIG. 1 is an explanatory diagram illustrating a control learning system to which the present technique is applied.

FIG. 1 is an explanatory diagram illustrating a control learning system to which the present technique is applied.

In the example in FIG. 1, a user 2 uses a control learning system 1 to control a control target 3. The control learning system 1 includes, for example, a terminal such as a robot, a home appliance, and a multi-functional mobile phone, a cloud service, and the like. The control target 3 is the user himself/herself, or anyone else such as a boss, a subordinate, a child, an aged person who needs a nursing care, and a person around. Note that the control target 3 is not limited to control of human beings, may include a pet, a plant, a harmful insect, and the like.

The user 2 inputs a person (user himself/herself, anyone else) as the control target 3, and setting of an objective state indicating how the user 2 wants to control the control target 3 to the control learning system 1 as indicated by an arrow A1.

The control learning system 1 executes an action as indicated by an arrow A2 so as to achieve the objective state set by the user 2. Examples of the action include utterance, reproduction of sounds or videos, sending messages, and activation of applications. The control learning system 1 observes a state of the user 2 as indicated by an arrow A3. Also, the control learning system 1 senses a target state, which is a state of the control target 3, as indicated by an arrow A4.

The control learning system 1 then performs reinforcement learning through the utterance or the like of the user 2 to learn what kind of action is to be taken for the state of the control target 3 to make the control target 3 closer to the objective state set by the user 2 as indicated by A5.

The reinforcement learning is a learning method through which a machine (system) by itself learns an action A for maximizing a reward R given in a state S. In the example illustrated in FIG. 1, the control learning system 1 automatically acquires an algorithm for controlling the control target 3 as desired according to utterance or the like from the control learning system 1. In other words, here, the reward R corresponds to "whether or not a person is successfully controlled as setting" and the action A corresponds to "utterance or the like from the control learning system 1."

With the progress of the learning, the control learning system 1 selects (automatically adds, automatically recommends) an action for bringing the control target 3 close to the objective state more effectively, and executes the action.

As described above, in the control learning system 1 illustrated in FIG. 1, by using the reinforcement learning, the control learning system 1 can automatically acquire a method of controlling the control target 3. Accordingly, the control learning system 1 can be caused to learn the method of controlling a person efficiently with cooperation between the person and the system.

Figure 2:
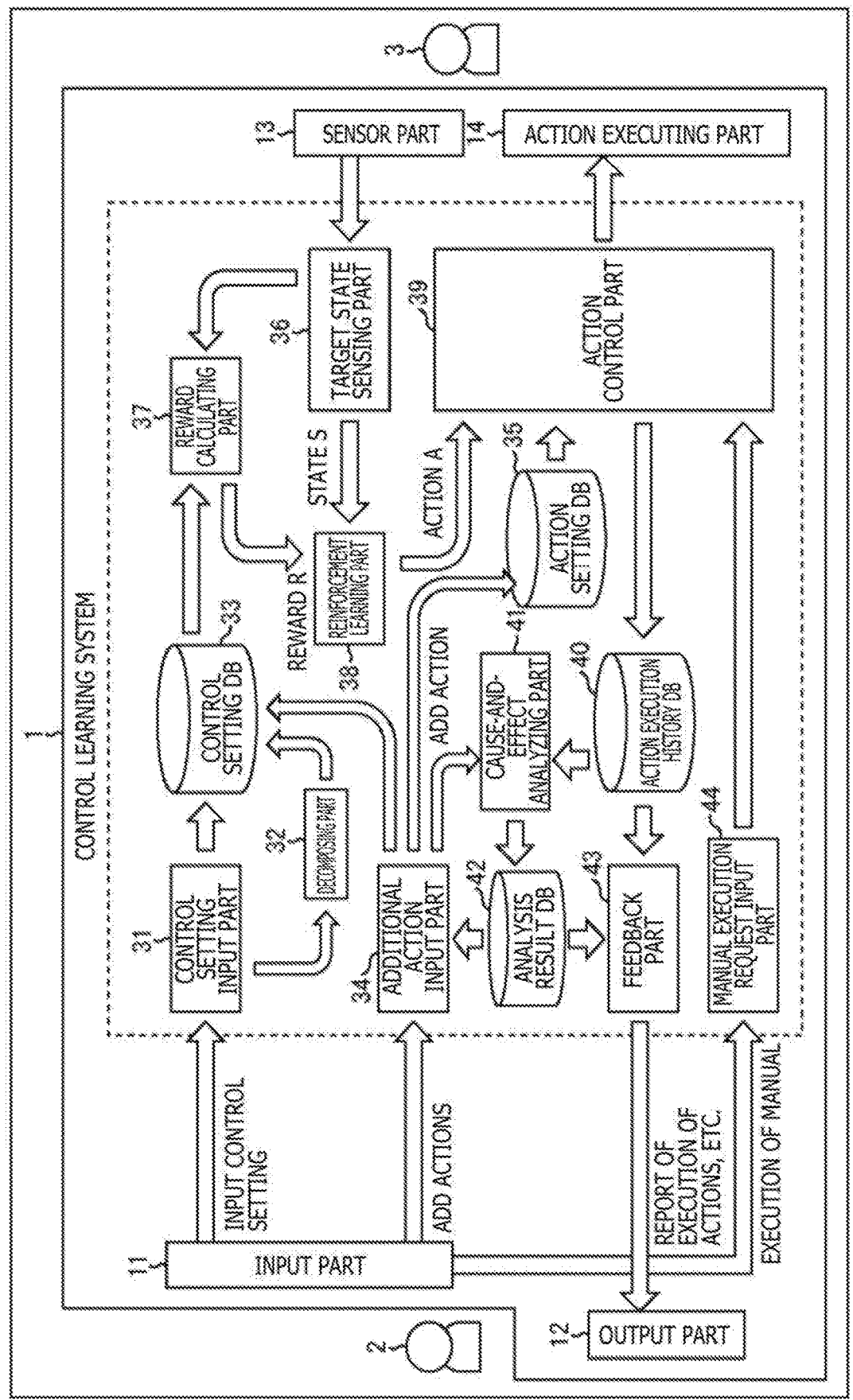
FIG. 2 is a block diagram illustrating a detailed configuration example of the control learning system.

FIG. 2 illustrates a detailed configuration example of the control learning system.

In the example illustrated in FIG. 2, the control learning system 1 includes an input part 11, an output part 12, a sensor part 13, and an action execution part 14, a control setting input part 31, a decomposing part 32, a control setting DB 33, an additional action input part 34, an action setting DB 35, a target state sensing part 36, a reward calculating part 37, a reinforcement learning part 38, an action control part 39, an action execution history DB 40, a cause-and-effect analyzing part 41, an analysis result DB 42, a feedback part 43, and a manual execution request input part 44.

Note that the control learning system 1 may include, for example, only a terminal such as a robot, a home appliance, or a multi-functional mobile phone, or may include the terminal and a cloud system. In a case where the control learning system 1 includes a plurality of apparatuses, as long as each apparatus is provided with a transmitting part and a receiving part connected to a network and the operation input part 11, the output part 12, the sensor part 13, and the action execution part 14 are provided on the terminal side, other parts may be provided either on the terminal side or on the cloud service side. Note that the control learning system 1 may include a terminal, a home server, and a cloud system. In this case as well, as long as the operation input part 11, the output part 12, the sensor part 13, and the action execution part 14 are provided on the terminal side, other parts may be provided on the terminal side, on the home server side, or on the cloud service side. However, it is preferable that the individual DBs are provided on the cloud system side.

The input part 11 may include, for example, a touch panel, a mouse, a keyboard, a microphone, or a camera. The input part 11 inputs control setting input items (control target 3, objective state, date and time of achievement, action, frequency, cost, etc.) to the control setting input part 31 in response to an action (operation or utterance) of the user acquired from the image or the sound.

The input part 11 inputs an additional action to the additional action input part 34 in response to the operation, the utterance or movement of the user. The input part 11 inputs manual execution to the manual execution request input part 44 in response to the operation or the utterance of the user.

The output part 12 includes an LCD or a speaker, and displays a screen for operating the objective state or a report of the action execution from the feedback part 43 or outputs a sound corresponding to the report.

The sensor part 13 includes a camera, various sensors (tactile sensor, acceleration sensor, gyro, microphone) and the like. The sensor part 13 senses the state of the control target 3 and supplies the sensing results to the target state sensing part 36.

The action execution part 14 executes an action for the control target 3. The action execution part 14, for example, speaks languages, reproduces videos, reproduces music or sounds, sends messages, or executes other applications.

The control setting input part 31 receives the control target 3 and objective state set by the user 2 and supplies those to the decomposing part 32 or the control setting DB 33. The decomposing part 32 decomposes the objective state based on the characteristics of the control target 3 and the objective state, and registers the control target 3 and the decomposed objective state in the control setting DB 33.

The control setting DB 33 stores the characteristics of the control target 3 and the objective state from the control setting input part 31 or the decomposing part 32 and, in corresponding thereto, an additional action from the additional action input part 34 in an associated manner.

The additional action input part 34 supplies an additional action from the input part 11 or from the analysis result DB 42 after the cause-and-effect analysis by the cause-and-effect analyzing part 41 to the control setting DB 33, the action setting DB 35 and the cause-and-effect analyzing part 41. The action setting DB 35 stores the additional action from the additional action input part 34.

The target state sensing part 36 supplies the state S based on sensing information from the sensor part 13 to the reward calculating part and the reinforcement learning part 38. The reward calculating part 37 calculates the reward R based on the state S from the target state sensing part 36 and the characteristics of the control target 3 and the objective state stored in the control setting DB 33. The reinforcement learning part 38 performs the reinforcement learning using the reward R calculated by the reward calculating part 37 and the state S from the target state sensing part 36 and supplies the action A selected as being better to the action control part 39.

The action control part 39 controls an action of the action execution part 14 according to the action A from the reinforcement learning part 38, an action read from the action setting DB 35, or a manual execution request from the manual execution request input part 44. The action control part 39 also registers an execution history of actions (actions and results of the actions) in the action execution history DB 40.

In the action execution history DB 40, the execution history of actions is registered by the action control part 39.

Note that the same actions may be flagged for each user. In addition, the frequency of an action may be made controllable.

The cause-and-effect analyzing part 41 performs cause-and-effect analysis based on the action from the additional action input part 34 or the execution history of actions (actions and results of the actions) from the action execution history DB 40, and registers the results in the analysis result DB 42. Examples of the method of cause-and-effect analysis include Max-min Hill Climbing or a method of inspecting the accuracy by eliminating object variables. The analysis result DB 42 registers the result of cause-and-effect analysis, and supplies an additional effective action to the additional action input part 34.

The feedback part 43 outputs the result of analysis from the analysis result DB 42 and notification of an action having an action execution history DB effect or recommendation to the user to the output part 12.

The manual execution request input part 44 accepts a manual execution request of an action input via the input part 11 by the user 2 and issues an instruction to the action control part 39.

<Setting of Objective State>

The control learning system 1 will be described in detail below. First, setting of the objective state indicated by the arrow A1 illustrated in FIG. 1 described above will be described.

FIG. 3 is an example of a setting screen for setting the objective state for the control target 3.

For example, the user 2 takes an image (picture) of the control target 3 and inputs the taken image (the control target 3 and the objective state) to the control learning system 1 while viewing a setting screen 51 displayed on the output part 12.

In the setting screen 51, "an image (of a sleeping baby)" is displayed as the objective state, and "every three hours, and continuing at least two hours" is displayed as date and time of achievement, "utterance, music" is displayed as an action, "20 times/day at maximum" is displayed as frequency, and "100 yen/day" is displayed as a cost. By pressing an ADD button provided on a lower portion of the setting screen 51, the user 2 can add these pieces of information as the objective state.

Here, through One shot-learning technique, which is a technique of the machine learning for enabling a recognition machine to learn adequately from very small data, the user 2 takes one or several pictures (images), and the objective state of the control target 3 can be input to the control learning system 1.

The setting screen 51 may be configured in such a manner that the date and time of achievement can be set from among every week (day of the week which the user wants to set), every day, time or period by or during which the user wants to achieve, and so on. A type of actions to be executed, an allowable cost (when a fee-charging API is used, for example), and the frequency of the action such as once a day can also be set.

Further, the user 2 may set the objective state by utterance such as, for example, "control my daughter to sleep every three hours at least for two hours, action should be music or speaking (utterance), up to twenty times a day," "control to be quiet in library," and so on. Also, the user 2 may set the objective state by a combination of the image and the utterance.

Also, the user may choose one from recipes that other users have created. Note that a recipe is a profile created by individual or shared in public, and is used in Web service such as IFTTT. Further, a task (study or the like) which requires several steps (stages) to achievement may be decomposed into smaller tasks by the decomposing part 32 (for example, to pass a test→to study every day).

In this case, a table including the objectives and the objectives after decomposition as illustrated in FIG. 4 is prepared as a data set 61 at the time of design. For example, the data set 61 including data in which the objective after decomposition is to study xx minutes every day for a case where the objective is to pass a xxx examination, and data in which the objective after decomposition is to exercise xx minutes every day for a case where the objective is to reduce the weight by xx kg by a diet.

Figure 5:
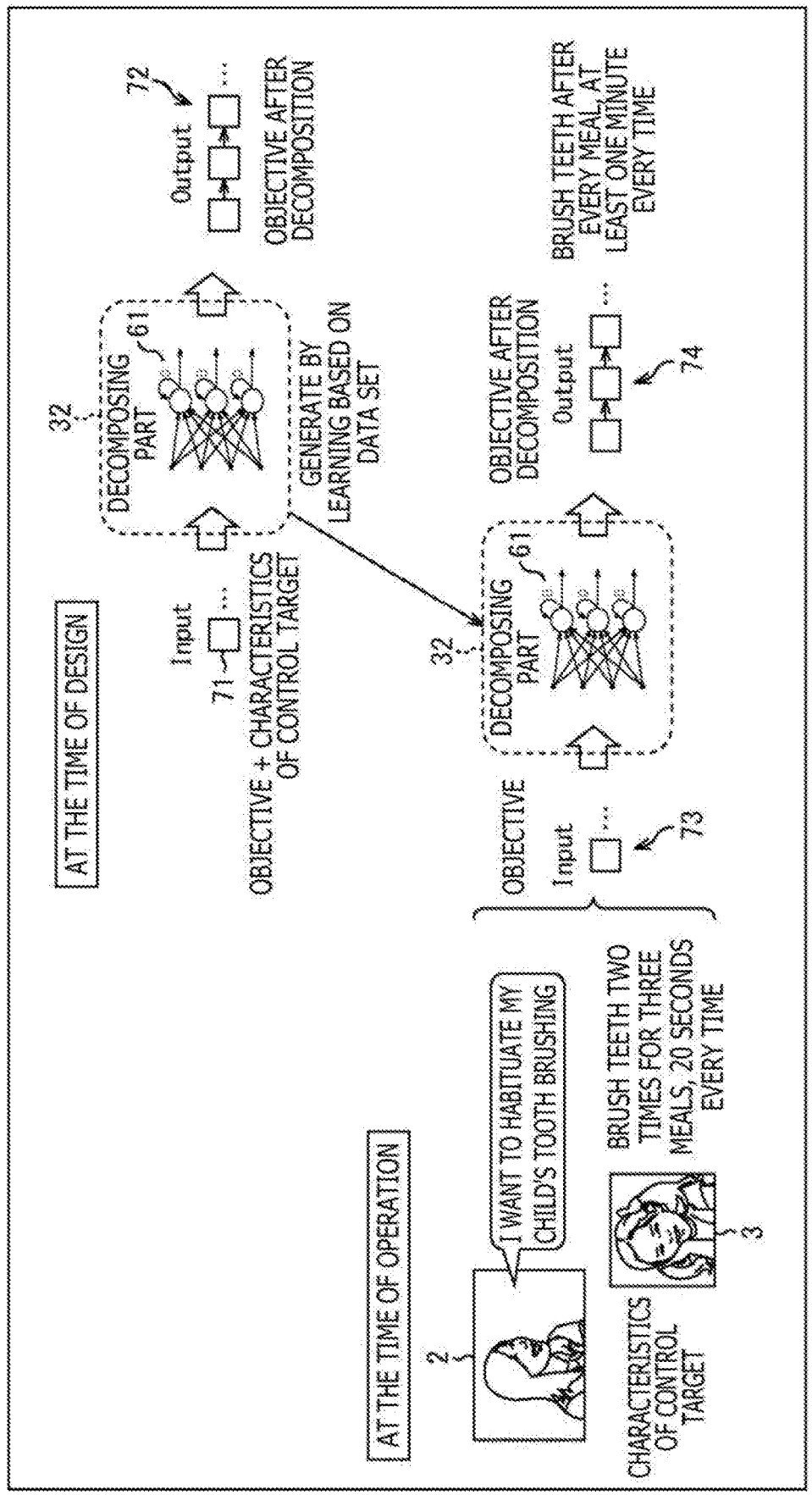
FIG. 5 is an explanatory diagram illustrating decomposition of an objective.

Also, at the time of design, the decomposing part 32 inputs (objective+characteristics of the control target 3) 71, learns based on the data set 61, and then prepares and outputs an objective 72 after decomposition as illustrated in FIG. 5.

Then, at the time of operation, when {the user 2's objective (I want to habituate my child's tooth brushing) and the characteristics of the control target 3 (brush teeth two times for three meals, for 20 seconds every time)} 73 is input, the decomposing part 32 decomposes the input by using the learned data set 61, and outputs the objective after decomposition (brush teeth after every meal for at least one minute every time) 74.

The decomposition of the objective is performed as described above.

<Execution of Action>

Next, execution of the action indicated by the arrow A2 illustrated in FIG. 1 described above will be described.

Figure 6:
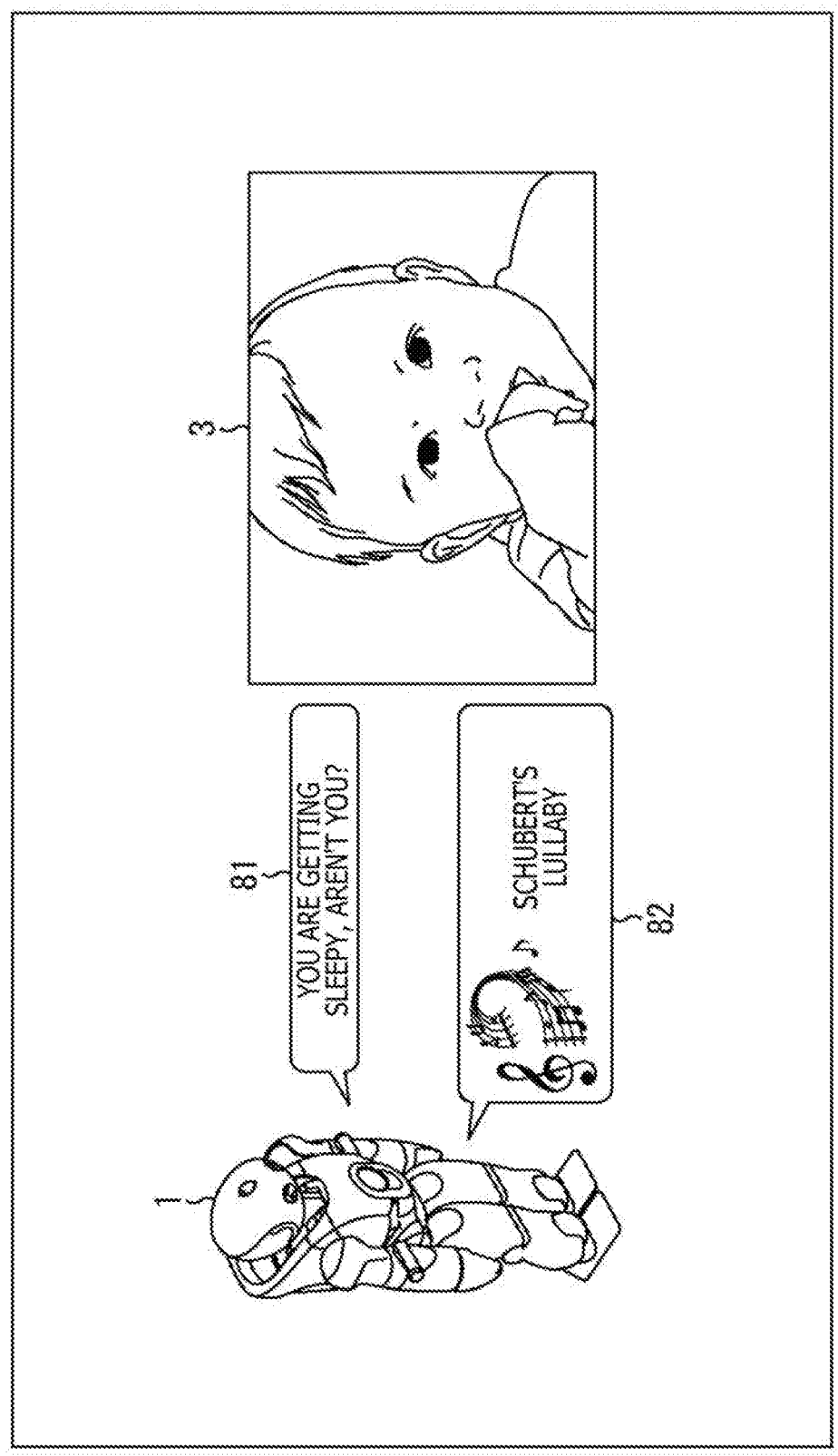
FIG. 6 is an explanatory diagram illustrating execution of an action.

The action control part 39 (action execution part 14) of the control learning system 1 executes utterance 81 such as "You are getting sleepy, aren't you?" or a content reproduction 82 such as "Schubert's Lullaby" as various actions registered for the control target 3 as illustrated in FIG. 6. Note that in the example illustrated in FIG. 6, an example in which the control learning system 1 is a robot (robot+cloud system) is indicated.

At the beginning, execution is substantially at random. However, more effective actions for achieving the objective state are executed at more effective timing as the reinforcement learning by the reinforcement learning part 38 progresses.

Examples of the actions that the control learning system 1 performs for achieving the objective include utterance, content reproduction (music, still image, movie, book reading, and the like), physical actions (robot actions, vibrations, tactile reproduction, and the like), stimulation of olfactory perception (aromas and the like), message sending, application activation, kick of external APIs, control of external systems such as air conditioning, and so forth.

The actions that the control learning system 1 can execute may include, in addition to those preset in advance, actions that the user has freely registered by the additional action input part 34 and actions that the user has manual-executed by the manual execution request input part 44. Such manual execution and addition of the actions may be performed by utterance. For example, by utterance saying "try to say 'good night' next time," utterance "good night" is registered as an action.

<Observation of User State>

Next, observation of the user state indicated by the arrow A3 illustrated in FIG. 1 described above will be described.

The control learning system 1 observes actions that the user 2, or other persons, or the control learning system 1 take for the control target 3 and the effects of the actions, and takes these actions as actions of itself.

Figure 7:
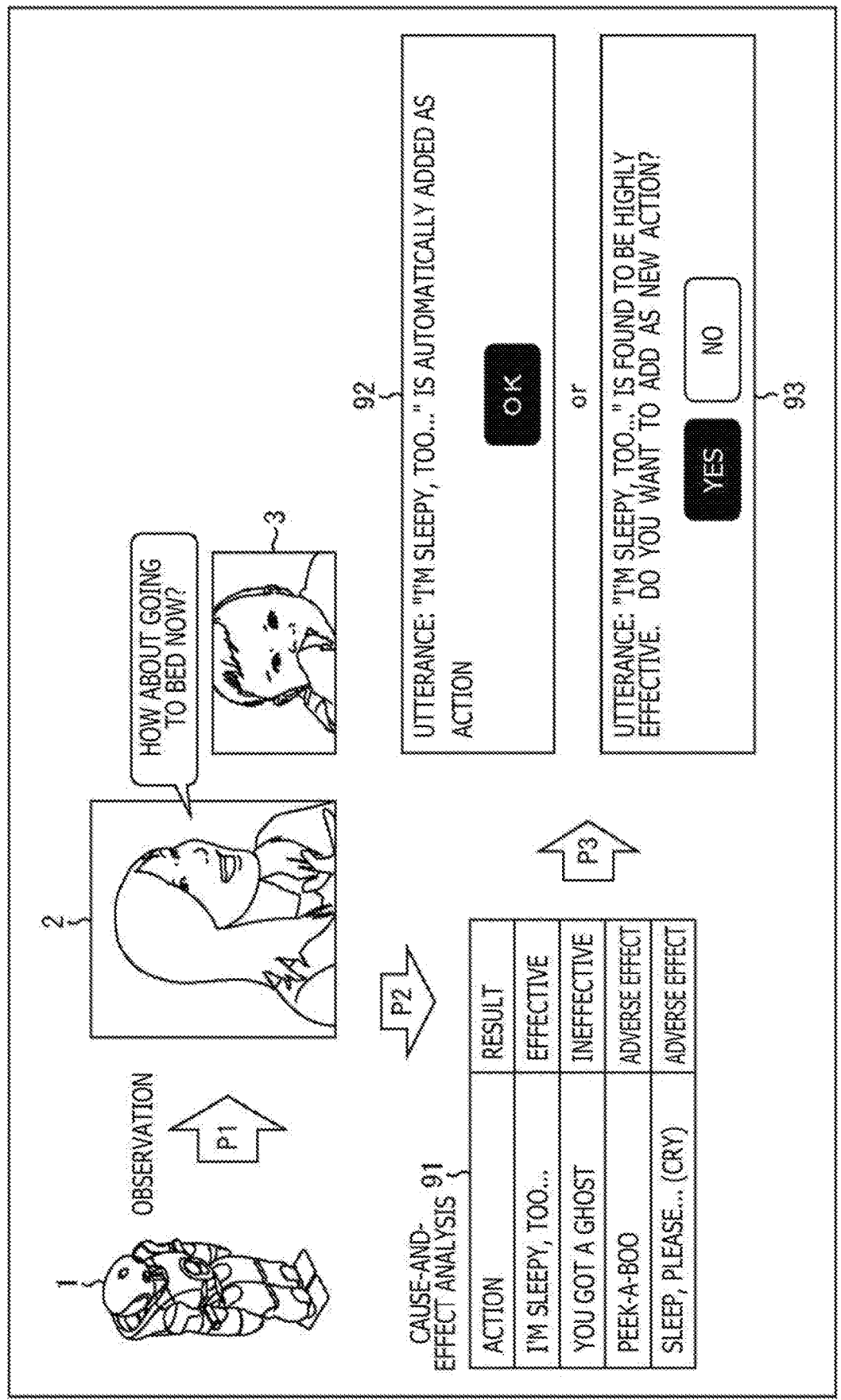
FIG. 7 is an explanatory diagram illustrating observation of a user state.

Specifically, as indicated by an arrow P1 illustrated in FIG. 7, the control learning system 1, which is a robot, observes utterance "How about going to bed now?" that the user 2 performs for the control target 3 and the effect of the utterance with various recognition techniques (image recognition, sound recognition).

The cause-and-effect analyzing part 41 performs the cause-and-effect analysis by using the actions and the effects and registers the result of analysis 91 to the analysis result DB 42 as indicated by an arrow P2. At this time, actions that the control learning system 1 can execute substitutionally are targets of the cause-and-effect analysis. In the result of analysis 91, the result of analysis of the action "I'm sleepy, too . . . " is "effective," the result of analysis of the action "You got a ghost" is "ineffective," the result of analysis of the action "peek-a-boo" has an "adverse effect," and the result of analysis of the action "Sleep, please . . . (cry)" has an "adverse effect."

Out of these results of analysis, the actions analyzed to be "effective" or "highly effective" may be automatically added by the additional action input part 34 as indicated by an arrow P3, and a notification 92 saying that "Utterance 'I'm sleepy, too . . . ' is automatically added as an action" may be supplied to the output part 12 by the feedback part 43.

Alternatively, a recommendation 93 "Utterance: 'I'm sleepy, too . . . ' is found to be highly effective. Do you want to add as a new action?" may be supplied to the output part 12 by the feedback part 43. In this case, by pressing a "YES" button provided in the recommendation 93, the action "I'm sleepy, too . . . " is registered.

Note that as a display regarding the actions, actions that are performed by a person (that is, actions that are preferably executed by a person, not by a system) may be recommended. Alternatively, a list of automatic execution actions may be displayed, and ON/OFF setting for each action may be enabled.

<Reinforcement Learning>

Next, the reinforcement learning indicated by the arrow A4 and A5 illustrated in FIG. 1 described above will be described.

The control learning system 1 senses the control target 3, and performs reinforcement learning with the reward based on whether or not the control target 3 reaches the objective state, and gradually learns a way of controlling as intended.

Figure 8:
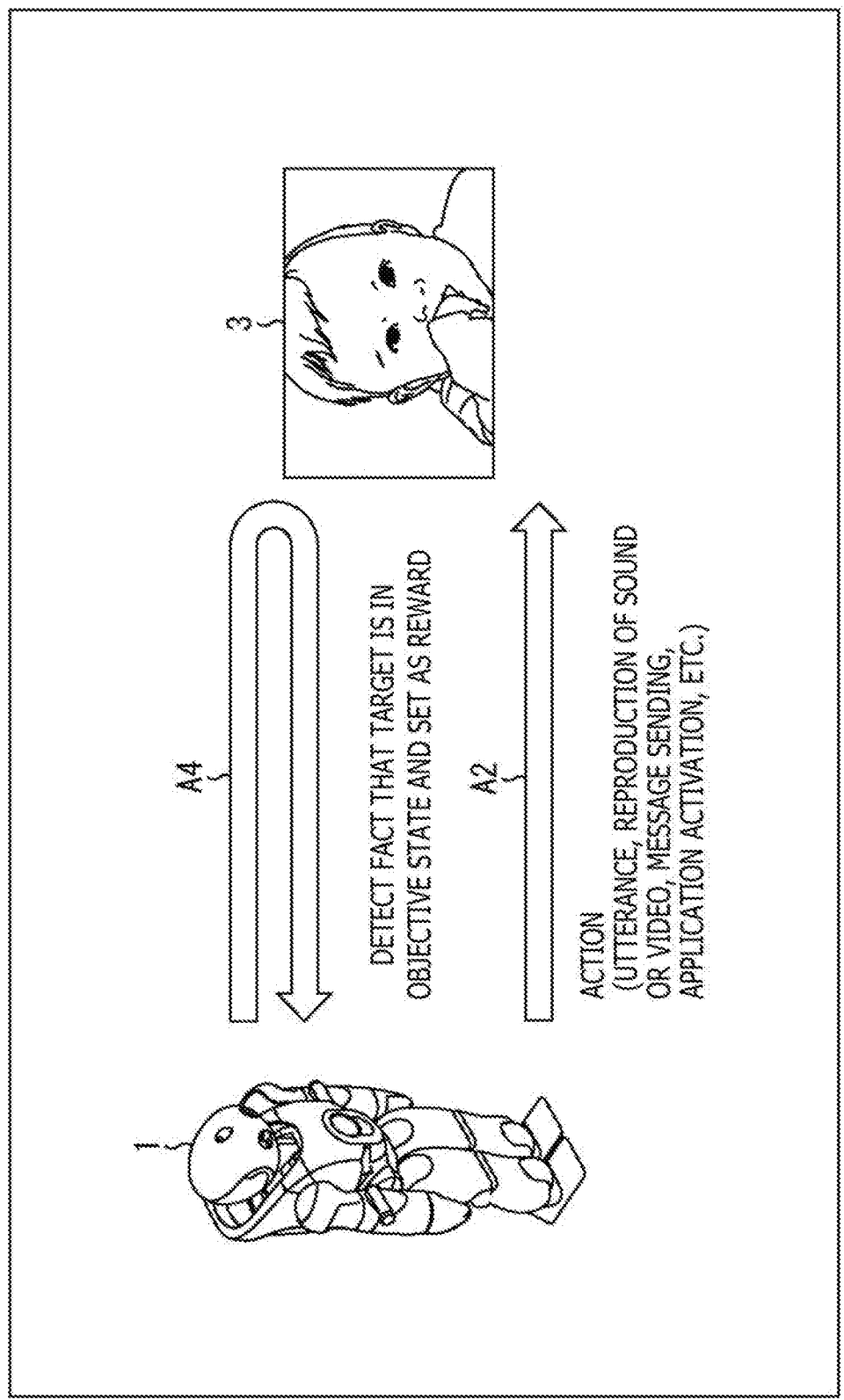
FIG. 8 is an explanatory diagram illustrating reinforcement learning.

As indicated by an arrow A4 illustrated in FIG. 8, the control learning system 1, which is a robot, senses the target state, and sets as a reward when the fact that the control target 3 has become the objective state is detected. Also, as indicted by A2, actions (utterance, reproduction of sounds and videos, message sending, application activation, etc.) are taken.

Specifically, the target state sensing part 36 acquires sensing information from the sensor part 13, and supplies the sensing information to the reward calculating part 37 and the reinforcement learning part 38 as the state S. In addition to the control target 3, the sensor part 13 senses a state (environment and place) where the control target 3 is in.

Figure 9:
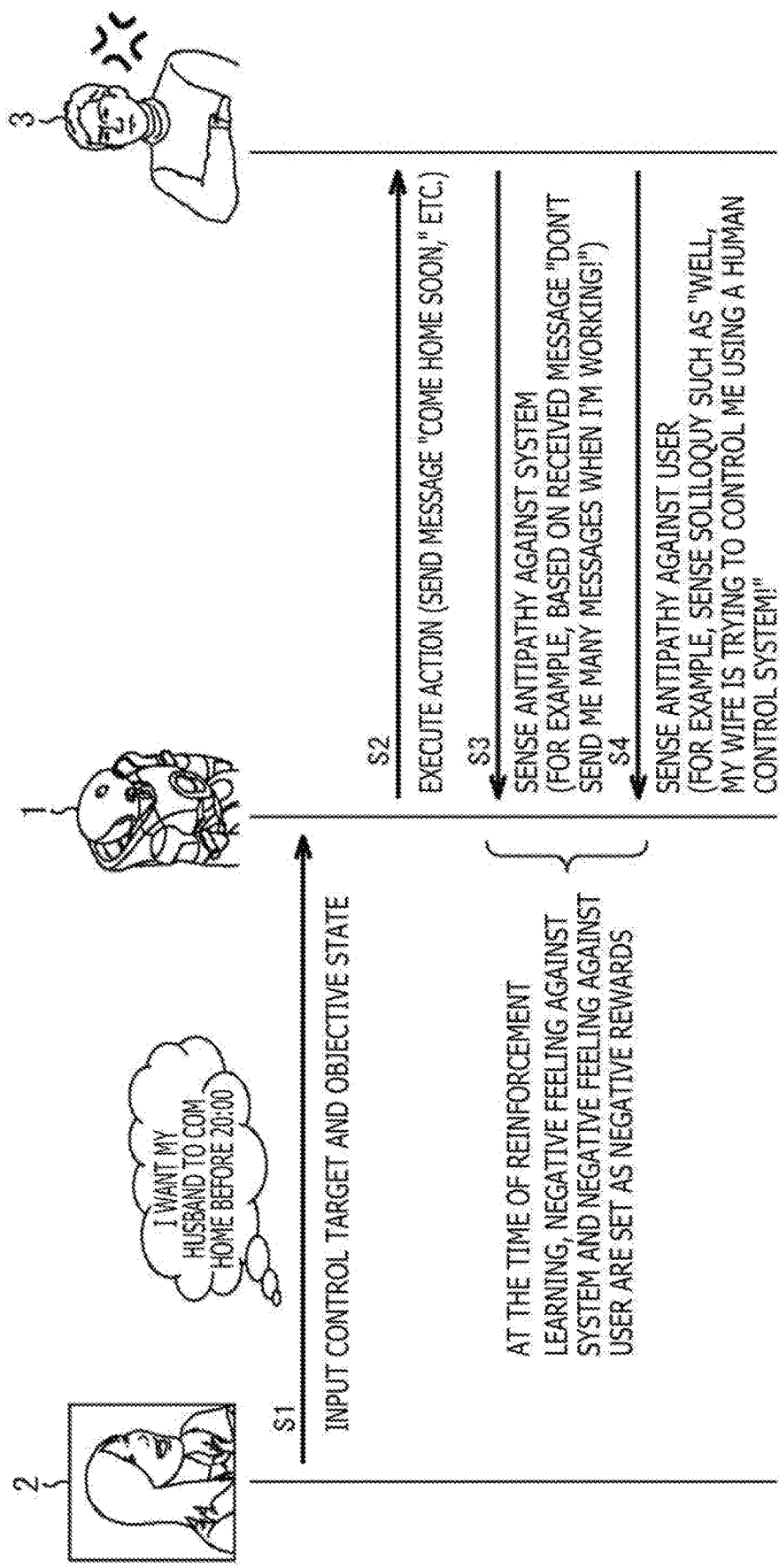
FIG. 9 is an explanatory diagram illustrating an example of a negative reward.

The reward calculating part 37 detects the fact that the target has become the objective state, and sets as a reward R. In order to stabilize the control learning system 1, several rewards are programmed in the reward calculating part 37 in advance. For example, negative rewards as described later with reference to FIG. 9 are also programmed. The negative rewards are rewards received in a case where the control target 3 is made to feel uncomfortable, or rewards received in a case where the control target 3 has a negative feeling against the user 2 or the control learning system 1.

Utilizing the result of learning for a target similar to the control target, a learning speed can be increased, and the control accuracy can be improved. Note that Domain Adaptation or Transfer Learning may be applied in this case.

It is also possible to intentionally cause the control learning system 1 to try a specific action by receiving the utterance of the user ("Try to reproduce Schubert's Lullaby now," for example) by the manual execution request input part 44.

In addition, the control learning system 1 retains a history regarding what actions have been made at what time in the action execution history DB 40, and the feedback part 43 can provide a UI for displaying in a list or reading out the history in the action execution history DB 40 and supplying a report to the user. For example, a report such as "Today I said 'I'm sleepy, too' at xx o'clock. Thirty minutes after, the target reached the objective state" is made.

FIG. 9 is an explanatory diagram illustrating an example of a negative reward.

In Step S1, the user 2 utters "I want my husband to come home before 20:00" to input the control target 3 "husband" and the objective state "coming home before 20:00 is desired" to the control learning system 1.

The control target 3 and the objective state are supplied to the reward calculating part 37 via the input part 11, the control setting input part 31, and the control setting DB 33 of the control learning system 1. The reward calculating part 37 calculates the reward R, and supplies the calculated reward R to the reinforcement learning part 38. The reinforcement learning part 38 performs learning based on the reward R from the reward calculating part 37 and the state S from the target state sensing part 36, and supplies the action A to the action control part 39.

In Step S2, the action control part 39 executes the action A (for example, sending a message "come home soon").

In response, in Step S3, the sensor part 13 senses antipathy of the control target 3 against the control learning system 1 (for example, based on a received message "Don't send me many messages when I'm working").

Alternatively, in Step S4, the sensor part 13 senses antipathy of the control target 3 against the user 2 (for example, senses soliloquy such as "well, my wife is trying to control me using the control learning system 1!").

The reinforcement learning part 38 receives the negative feeling (antipathy) against the control learning system 1 and the negative feeling (antipathy) against the user sensed in the manner described above as negative rewards at the time of reinforcement learning. Accordingly, the control learning system 1 may be stabilized.

<System Operation>

Figure 10:
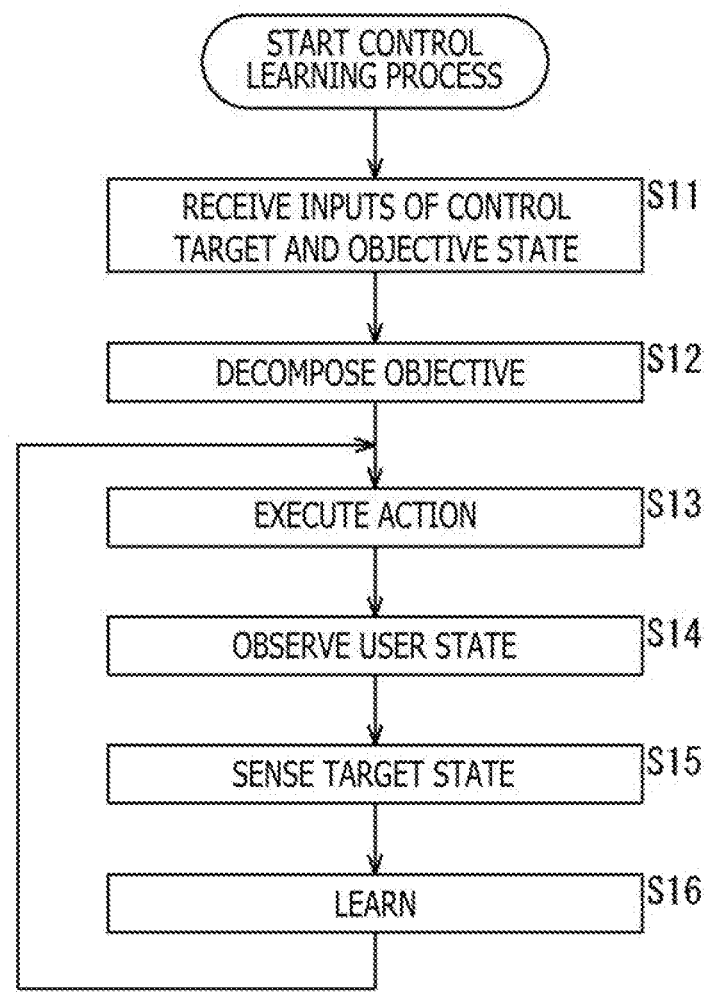
FIG. 10 is an explanatory flowchart illustrating control learning processing of a control learning control system.

Referring next to a flowchart illustrated in FIG. 10, a control learning process performed by the control learning system 1 will be described.

In Step S11, the control setting input part 31 receives inputs of the control target 3 and the objective state from the input part 11. The received control target 3 and the objective state are registered in the control setting DB 33 and are supplied to the decomposing part 32.

In Step S12, the decomposing part 32 performs decomposition of the objective as described above with reference to FIG. 4 and FIG. 5. The objective after decomposition is registered in the control setting DB 33. Note that in a case where the objective is simple, the decomposition does not have to be performed.

In Step S13, the action execution part 14 executes an action under control of the action control part 39. In other words, the action control part 39 causes the action execution part 14 to execute an action according to the action A from the reinforcement learning part 38, the action read from the action setting DB 35, or the manual execution request from the manual execution request input part 44. After the execution of the action, the action control part 39 registers the history of the action in the action execution history DB 40.

In Step S14, the additional action input part 34 observes the user state based on an image, sound, and information (operation, utterance, or movement of the user) input from the input part 11.

In Step S15, the target state sensing part 36 senses the target state of the control target 3, and supplies the sensed state S to the reward calculating part 37 and the reinforcement learning part 38.

In Step S16, the reinforcement learning part 38 performs reinforcement learning to learn what kind of action is to be taken for the state of the control target 3 to make the control target 3 closer to the objective state set by the user 2 through the utterance or the like of the user 2. The reinforcement learning part 38 performs the reinforcement learning using the reward R calculated by the reward calculating part 37 and the state S from the target state sensing part 36 and supplies the action A selected as being better to the action control part 39.

The procedure goes back to Step S13, and steps from then onward are repeated until the control target 3 becomes the objective state or until a user A gives an instruction to end.

At the beginning, execution is substantially at random. However, with the progress of the learning, the control learning system 1 selects (automatically adds, automatically recommends) an action for bringing the control target 3 close to the objective state more effectively, and executes the action. In other words, with the progress of the learning, more effective actions for achieving the objective state are executed at more effective timing.

As described thus far, according to the present technique, the system can be made to learn the method of controlling a person efficiently with cooperation between people and the system.

Note that the present technique can be applied not only to terminals such as home appliances, robots, and smart phones, but also to vehicles, surgical operation apparatuses, factory machines, apparatuses in hospitals or machines used by dentists for shaving down teeth.

2. Second Embodiment

<Personal Computer>

A series of processing described above may be executed by hardware or may be executed by software. In a case of executing the series of processing by software, a program which constitutes the software is installed in a computer. Examples of the computer here include a computer incorporated in hardware for exclusive use, and a general-purpose personal computer capable of executing various functions by installing various programs.

Figure 11:
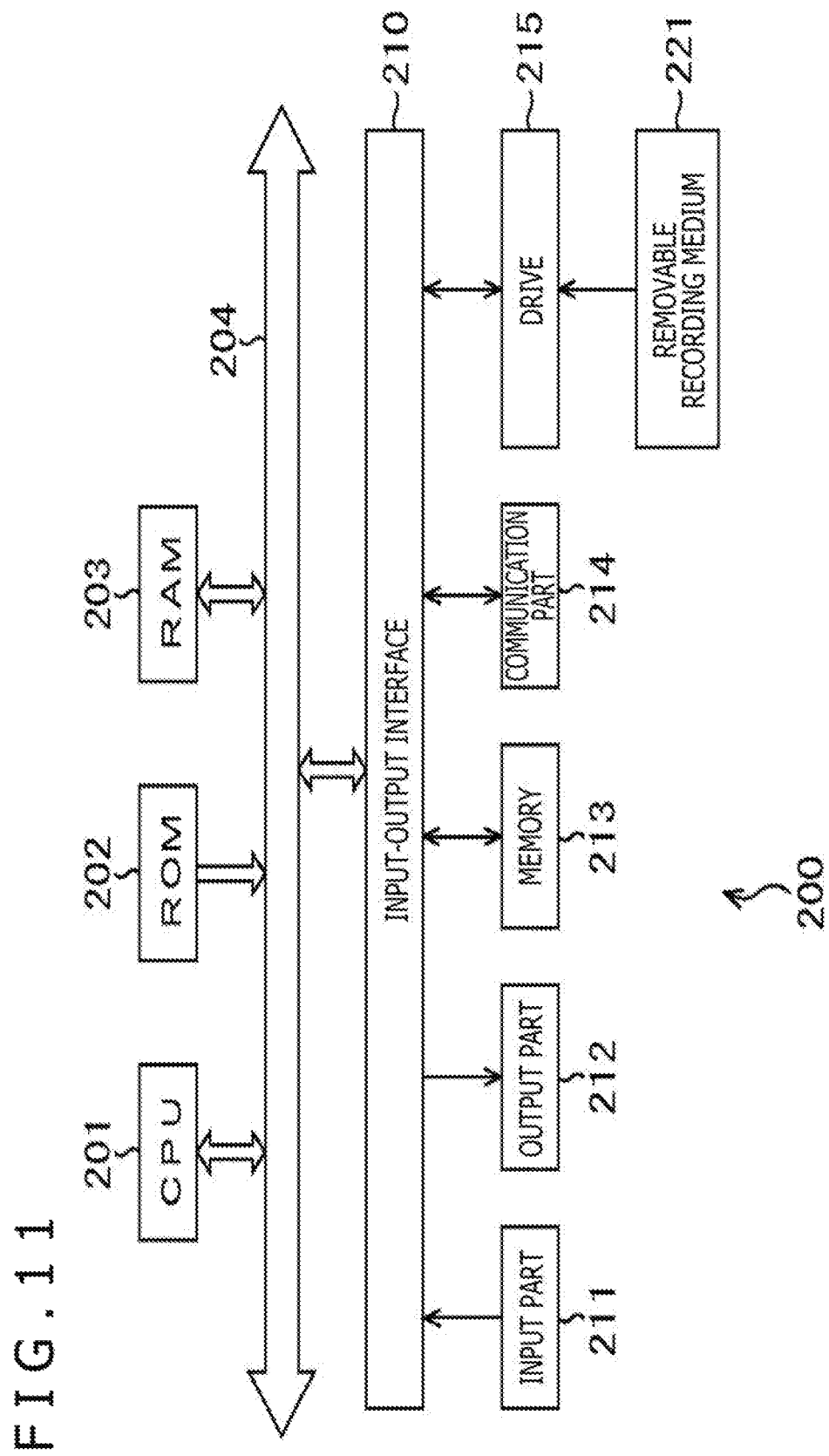
FIG. 11 is a block diagram illustrating an example of a personal computer to which the present technique is applied.

FIG. 11 is a block diagram illustrating a configuration example of hardware of a personal computer to be executed by programs in a case where the personal computer constitutes part or entire part of the series of processing described above.

In a personal computer 200, a CPU (Central Processing Unit) 201, a ROM (Read Only Memory) 202, and a RAM (Random Access Memory) 203 are connected to each other with a bus 204.

An input-output interface 205 is also connected to the bus 204. An input part 206, an output part 207, a memory 208, a communication part 209, and a drive 210 are connected to the input-output interface 205.

The input part 206 includes a keyboard, a mouse, a microphone, and the like. The output part 207 includes a display, a speaker, and the like. The memory 208 includes a hard disk or a non-volatile memory and the like. The communication part 209 includes a network interface or the like. The drive 210 drives a removable recording medium 211 such as a magnetic disc, an optical disc, a magneto optical disc, or a semiconductor memory.

In the personal computer 200 configured as described above, for example, the CPU 201 loads a program stored in the memory 208 into the RAM 203 via the input-output interface 202 and the bus 204 and executes the program. Accordingly, the series of processing described above is performed.

The program executed by the computer (CPU 201) may be provided by recording in the removable recording medium 211. Examples of the removable medium 211 include a magnetic disc (including flexible disc), an optical disk (CD-ROM (Compact Disc-Read Only Memory), DVD (Digital Versatile Disc), etc.), a magneto optical disc, or a package medium including a semiconductor memory or the like. Further, alternatively, the program may be provided via a wired or wireless transmission medium such as a local area network, the Internet, and a digital satellite broadcast.

In the computer, the program may be installed in the memory 208 via the input-output interface 205 by loading the removable recording medium 211 in the drive 210. Also, the program may be received by the communication part 209 via the wired or wireless transmission medium, and installed in the memory 208. As other options, the program can be installed in the ROM 202 or in the memory 208 in advance.

Note that the program executed by the computer may be a program to perform the processing steps in time series in accordance with the order described in this specification, or may be a program to perform the processing steps in parallel or in a stage when required, such as at the time of a call.

Also, in this specification, the steps describing the program to be recorded in the recording medium include processing steps performed in time series in accordance with the order described here as a matter of course, and also include processing steps that are not necessarily executed in time series, but are executed in parallel or individually.

Also, in this specification, the term "system" means the entire apparatus including a plurality of devices (apparatuses).

For example, the present disclosure may adopt a configuration of cloud computing in which a plurality of apparatuses perform one function in a shared and cooperated manner via a network.

Figure 12:
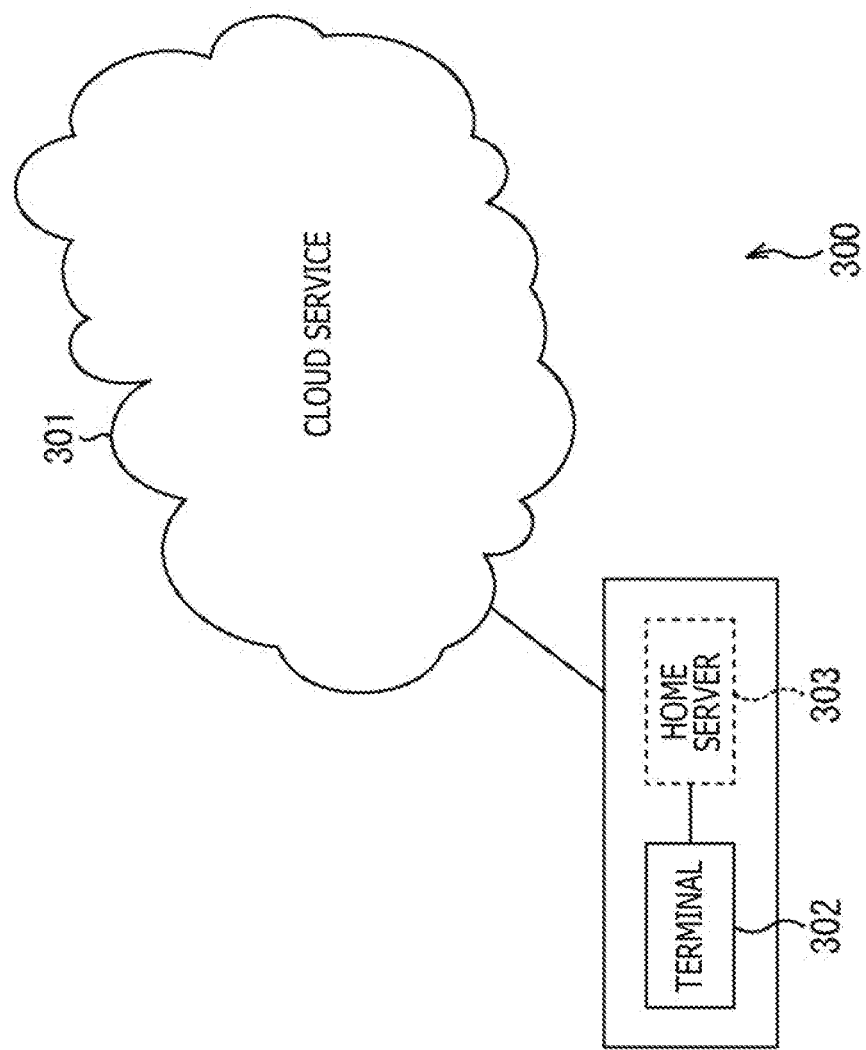
FIG. 12 is a diagram illustrating an example of a cloud service to which the present technique is applied.

For example, the present technique may be applied to a network system including a plurality of apparatuses. FIG. 12 illustrates an example of a schematic configuration of the network system to which the present technique is applied.

A network system 300 illustrated in FIG. 12 is a system in which apparatuses perform control learning on a control target via a network. A cloud service 301 of the network system 300 is a system which provides a service to perform control learning on a control target together with a terminal 302, a home server 303, and the like communicably connected thereto. For example, the cloud service 301 provides a part surrounded by a dotted line in the control learning system 1 illustrated in FIG. 2. In this case, the terminal 302 provides an input/output portion other than the part surrounded by the dotted line of the control learning system 1 illustrated in FIG. 1 (the operation input part 11, the output part 12, the sensor part 13, and the action execution part 14). Also, for example, only the control setting input part 31, the decomposing part 32, and the control setting DB 33 of the control learning system 1 illustrated in FIG. 2 may be provided in the home server 303, or the home server 303 may be omitted. In this manner, as long as the operation input part 11, the output part 12, the sensor part 13, and the action execution part 14 are provided on the terminal side, each of the remaining parts may be provided on the terminal (or the home server) side, or on the cloud service side. Note that in a case where the control learning system 1 illustrated in FIG. 2 includes a plurality of apparatuses, although not illustrated, each apparatus is provided with a transmitting part and a receiving part connected to the network.

Any physical configuration of the cloud service 301 is applicable. For example, the cloud service 301 may have not only a service for performing control learning on a control target, but also another server and a network of any type such as the Internet or LAN.

Examples of the terminal 302 include a robot, a home appliance such as a refrigerator or an air conditioner, furniture, audio-video equipment such as a television receiving set, a hard disk recorder, a game machine, or a camera, a personal computer, a hand-held type information processing apparatus such as a laptop personal computer, a tablet terminal, a mobile phone, or a smart phone, and wearable equipment such as glasses and a watch.

By applying the present technique to the network system 300 as described above such that the control learning is performed on the control target between the terminal 302 and the cloud service 301, high-speed processing can be achieved with the server of the cloud service 301 without applying a load only on the terminal 302, so that services that satisfy users may be provided.

Also, the cloud service 301 may provide a service to provide action sets for certain objective states for a charge, a service to charge for an increase in the number of control targets and the number of registered actions, a service to include an advertisement in action content, and a service to sell data (control-need data or person's behavior pattern data).

Note that a configuration described above as one apparatus (or one processing part) may be divided to be configured as a plurality of apparatuses (or processing parts). In contrast, a configuration described above as a plurality of apparatuses (or processing parts) may be integrated into one apparatus (or one processing part). Alternatively, a configuration other than those described above may be added to each apparatus (or each processing part) as a matter of course. In addition, as long as the configuration as the entire system and the operation remain substantially the same, part of the configuration of a certain apparatus (or processing part) may be included in a configuration of another apparatus (or another processing part). In other words, the present technique is not limited to the embodiments described above, and various modifications may be made without departing the gist of the present technique.

Although the preferred embodiments of the present disclosure have been described in detail with reference to the attached drawings, the present disclosure is not limited to those embodiments. For those skilled in the art of the present disclosure, it is apparent that various modified examples or changed examples may be considered within a range of the technical thought described in the claims, and these examples should be understood to be included in the technical scope of the present disclosure as a matter of course.

Note that the present technique may have the following configuration.

(1) An information processing apparatus including:
a reward calculating part configured to calculate a reward based on an input objective state of a control target and a state of the control target based on a sensing result of the control target;
a reinforcement learning part configured to perform reinforcement learning using the reward calculated by the reward calculating part and the state of the control target to select a better action for bringing the control target closer to the objective state; and
an action execution part configured to execute the action selected by the reinforcement learning part for the control target.

(2) The information processing apparatus according to (1), further including:
a cause-and-effect analyzing part configured to perform a cause-and-effect analysis on the action executed for the control target; and
an action adding part configured to add, as a result of the cause-and-effect analysis performed by the cause-and-effect analyzing part, a better action for bringing the control target closer to the objective state.

(3) The information processing apparatus according to (2), further including:
a notifier configured to notify regarding the action added by the action adding part.

(4) The information processing apparatus according to (3), in which
after the action is added by the action adding part,
the notifier notifies completion of the addition of the action by the action adding part.

(5) The information processing apparatus according to (3), in which
the notifier notifies a recommendation of the addition of the action by the action adding part, and
in a case where the addition of the action is instructed in response to the notification, the action adding part adds a better action for bringing the control target closer to the objective state.

(6) The information processing apparatus according to any one of (1) to (5), further including:
a decomposing part configured to decompose the objective state of the control target into smaller objectives.

(7) The information processing apparatus according to any one of (1) to (6), further including:
an action execution history DB configured to register a history of actions executed by the action execution part.

(8) The information processing apparatus according to any one of (1) to (7), further including:
an input receiving part configured to recognize the objective state of the control target through an input of an image.

(9) The information processing apparatus according to any one of (1) to (8), further including:
a sensor part configured to sense the control target.

(10) The information processing apparatus according to any one of (1) to (9), further including:
an action input part configured to input an action executed for the control target.

(11) An information processing method executed by an information processing apparatus, the information processing method including:
calculating a reward based on an input objective state of a control target and a state of the control target based on a sensing result of the control target;
performing reinforcement learning using the calculated reward and the state of the control target to select a better action for bringing the control target closer to the objective state; and
executing the selected action for the control target.

(12) A program causing a computer to function as:
a receiving part configured to receive a time-division multiplexed signal obtained by time-division multiplexing a signal that is a tactile signal including a waveform of a vibration for vibrating a vibrating part configured to perform a vibration and that is added with a header including description of information regarding the vibrating part using the tactile signal;
a separating part configured to separate the tactile signal and the header from the time-division multiplexed signal received by the receiving part;
a signal adjusting part configured to perform signal adjustment on the tactile signal separated by the separating part in accordance with the header separated by the separating part; and
the vibrating part configured to perform a vibration based on the tactile signal adjusted by the signal adjusting part.

REFERENCE SIGNS LIST

1 Control learning system, 2 User, 3 Control target, 11 Input part, 12 Output part, 13 Sensor part, 14 Action execution part, 31 Control setting input part, 32 Decomposing part, 33 Control setting DB, 34 Additional action input part, 35 Action setting DB, 36 Action control part, 37 Target state sensing part, 38 Reward calculating part, 39 Reinforcement learning part, 40 Action execution history part, 41 Cause-and-effect analyzing part, 42 Analysis result DB, 43 Feedback part, 44 Manual execution request input part, 51 Setting screen, 61 Data set, 81 Utterance, 82 Content reproduction, 91 Result of analysis, 92 Notification, 93 Recommendation, 200 Personal computer, 300 Network system, 301 Cloud service, 302 Terminal, 303 Home server

The invention claimed is:

1. An information processing apparatus, comprising:
a reward calculating part configured to calculate a reward based on an input objective state of a control target and a state of the control target based on a sensing result of the control target;
a reinforcement learning part configured to perform reinforcement learning using the reward calculated by the reward calculating part and the state of the control target to select a specific action for bringing the control target closer to the input objective state; and
an action execution part configured to execute the specific action selected by the reinforcement learning part for the control target.

2. The information processing apparatus according to claim 1, further comprising:
a cause-and-effect analyzing part configured to perform a cause-and-effect analysis on the specific action executed for the control target; and
an action adding part configured to add, as a result of the cause-and-effect analysis performed by the cause-andeffect analyzing part, the specific action for bringing the control target closer to the input objective state.

3. The information processing apparatus according to claim 2, further comprising
a notifier configured to notify regarding the specific action added by the action adding part.

4. The information processing apparatus according to claim 3, wherein
after the specific action is added by the action adding part, the notifier notifies completion of the addition of the specific action by the action adding part.

5. The information processing apparatus according to claim 3, wherein
the notifier notifies a recommendation of the addition of the specific action by the action adding part, and
in a case where the addition of the specific action is instructed in response to the notification, the action adding part adds the specific action for bringing the control target closer to the input objective state.

6. The information processing apparatus according to claim 1, further comprising
a decomposing part configured to decompose the input objective state of the control target into smaller objectives.

7. The information processing apparatus according to claim 1, further comprising
an action execution history DB configured to register a history of actions executed by the action execution part.

8. The information processing apparatus according to claim 1, further comprising
an input receiving part configured to recognize the input objective state of the control target through an input of an image.

9. The information processing apparatus according to claim 1, further comprising
a sensor part configured to detect the control target.

10. The information processing apparatus according to claim 1, further comprising
an action input part configured to input an additional action executed for the control target.

11. An information processing method executed by an information processing apparatus, the information processing method comprising:
calculating a reward based on an input objective state of a control target and a state of the control target based on a sensing result of the control target;
performing reinforcement learning using the calculated reward and the state of the control target to select a specific action for bringing the control target closer to the input objective state; and
executing the selected specific action for the control target.

12. A non-transitory computer-readable medium having stored thereon computer-readable instructions, which when executed by a processor, cause the processor to execute operations, the operations comprising:
calculating a reward based on an input objective state of a control target and a state of the control target based on a sensing result of the control target;
performing reinforcement learning using the calculated reward and the state of the control target to select a specific action for bringing the control target closer to the input objective state; and
executing the selected specific action for the control target.

* * * * *